(12) United States Patent
French

(10) Patent No.: US 9,045,225 B2
(45) Date of Patent: Jun. 2, 2015

(54) SKID STABILIZER FOR USE WITH A RADIO CONTROLLED HELICOPTER

(71) Applicant: Lou French, Holiday Hills, IL (US)

(72) Inventor: Lou French, Holiday Hills, IL (US)

( * ) Notice: Subject to any disclaimer, the term of this patent is extended or adjusted under 35 U.S.C. 154(b) by 96 days.

(21) Appl. No.: 13/964,092

(22) Filed: Aug. 11, 2013

(65) Prior Publication Data

US 2015/0041588 A1 Feb. 12, 2015

(51) Int. Cl.
*B64C 25/52* (2006.01)
*A63H 27/00* (2006.01)

(52) U.S. Cl.
CPC ................ *B64C 25/52* (2013.01); *A63H 27/12* (2013.01)

(58) Field of Classification Search
CPC ....... A63H 27/00; A63H 27/02; A63H 27/12; B64C 27/04; B64C 39/024; B64D 2201/00
USPC .......................... 446/34, 35, 36, 61, 454, 456; 244/17.17, 100 R, 108; 248/163.1, 248/176.1, 188.1, 188.8
See application file for complete search history.

(56) References Cited

U.S. PATENT DOCUMENTS

| | | | | |
|---|---|---|---|---|
| 4,270,711 | A * | 6/1981 | Cresap et al. ............... | 244/17.17 |
| 5,065,958 | A * | 11/1991 | Stubstad et al. ........... | 244/17.17 |
| 5,358,201 | A * | 10/1994 | Brown, Sr. .................... | 244/108 |
| 5,462,242 | A * | 10/1995 | Collins et al. ................. | 244/108 |
| 8,052,500 | B2 * | 11/2011 | Van De Rostyne et al. .... | 446/36 |

* cited by examiner

*Primary Examiner* — Kien Nguyen
(74) *Attorney, Agent, or Firm* — Depeng Bi; The Law Offices of Konrad Sherinian, LLC

(57) ABSTRACT

A skid stabilizer for use with a radio controlled model helicopter is disclosed. The skid stabilizer comprises a pair of substantially longitudinal skid protectors disposed parallel to one another and each adapted to support a main skid of a model helicopter. A pair of lateral supports joins the skid protectors. Adhesive pads are disposed on the bottom of both skid protectors.

6 Claims, 3 Drawing Sheets

SKID STABILIZER FOR USE WITH A RADIO CONTROLLED HELICOPTER

CROSS REFERENCE TO RELATED APPLICATIONS

None

FIELD OF THE DISCLOSURE

The present disclosure generally relates to a landing apparatus for use with a rotary wing aircraft; e.g., a helicopter. More specifically, the disclosure relates to a stabilizer for attachment to the landing skid of a radio controlled model helicopter.

BACKGROUND

Landing devices of various types are well known for both fixed wing and rotary wing aircraft with regards to both full size and model crafts. With regards to rotary wing aircraft such as, for example, helicopters, the use of a skid structure is well-known in the art. For example, most helicopters make use of a pair of main skids connected to the superstructure of the helicopter by a plurality of substantially vertical supports. Each skid has a flexible element that is designed to flex on contact with the ground without breaking. The skid serves both as a shock absorption device as well as a means of providing support for the superstructure of the helicopter.

The typical model helicopter will utilize a skid structure as described made out of a thin flexible plastic material. These skids are exceptionally susceptible to hard landings, as the two main skids tend to splay outwards and can break off. This results in costly repairs, which must be made to continue using the model helicopter.

n addition, the main skids of many helicopters tend to vibrate during flight, which negatively impact the flight characteristics of the model helicopter.

Accordingly, there exists a need for an alternative landing device for use with a traditional skid construction, or in place of a traditional skid construction, that prevents damage to the main skids of the radio controlled model helicopter during a typical hard landing. In addition, there exists a need for a device to stabilize the skids of a model helicopter to improve the flight characteristics thereof.

OBJECTS OF THE DISCLOSED SKID STABILIZER

Accordingly, it is an object of this disclosure to provide a skid stabilizer for use with a rotary wing aircraft.

Another object of this disclosure is to provide a skid stabilizer for use with a radio controlled rotary wing aircraft.

Another object of this disclosure is to provide a skid stabilizer for use with a radio controlled model rotary wing aircraft.

Another object of this disclosure is to provide a skid stabilizer for use with a radio controlled model helicopter.

Another object of this disclosure is to protect the main skids of a radio controlled model helicopter in the event of a hard landing.

Another object of this disclosure is to stabilize the main skids of a radio controlled model helicopter during flight.

Other advantages of this disclosure will be clear to a person of ordinary skill in the art. It should be understood, however, that a system or method could practice the disclosure while not achieving all of the enumerated advantages, and that the protected disclosure is defined by the claims.

SUMMARY OF THE DISCLOSURE

A skid stabilizer for use with a radio controlled model helicopter is disclosed. The skid stabilizer comprises a pair of substantially longitudinal skid protectors each adapted to support a main skid of a model helicopter. The skid protectors can be constructed of wood, and are disposed substantially parallel to one another with the ends substantially lined up with one another. The skid protectors are joined by a pair of lateral supports. The first lateral support is disposed toward the front of the skid protectors and the second lateral support is disposed toward the rear of the skid protectors. Adhesive pads are disposed on the bottom of both skid protectors.

The skid stabilizer is joined to the main skids of the radio controlled helicopter by four pull ties, with the first pull tie disposed on the first skid protector forward of the first lateral support, the second pull tie disposed rear of the second lateral support on the first skid protector, the third pull tie is disposed rear of the second lateral support on the second skid protector, and the fourth pull tie is disposed forward of the first lateral support on the second skid protector.

The first and second lateral supports can be directly connected to the first and second skid protectors by holes bored in the sides of the skid protectors with an adhesive, such as epoxy, holding the lateral supports in place.

BRIEF DESCRIPTION OF THE DRAWINGS

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

DETAILED DESCRIPTION

Figure 1:
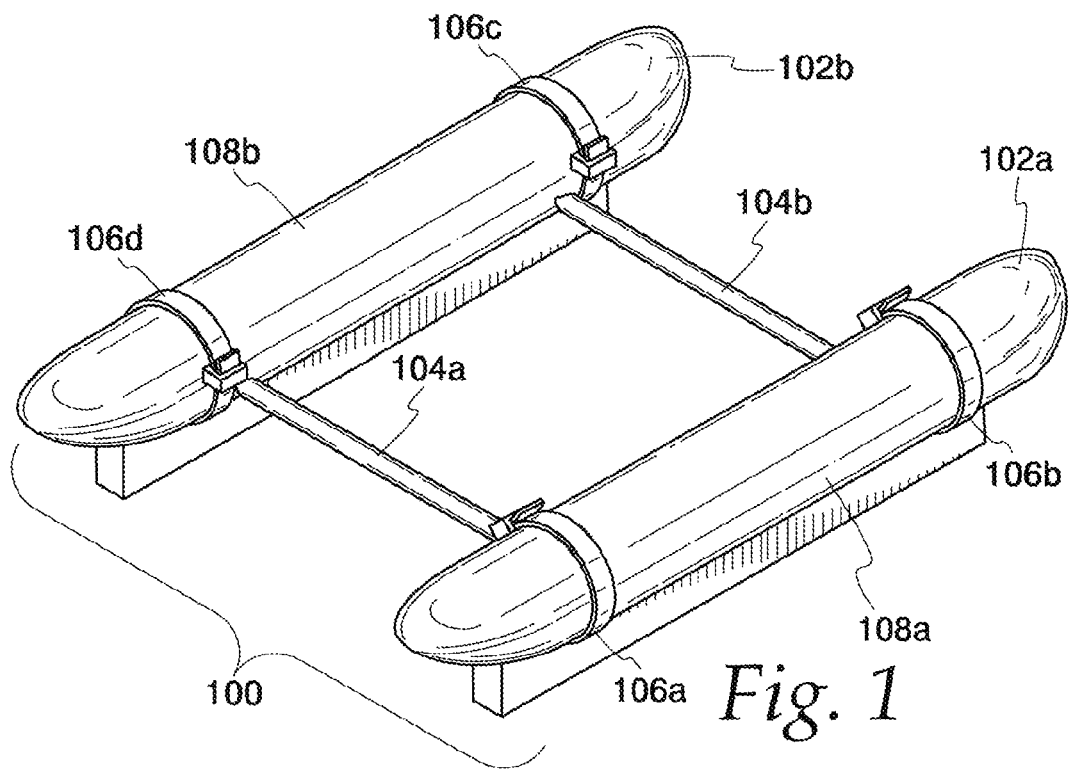
FIG. 1 is a perspective diagram of a skid stabilizer for use with a radio controlled model helicopter.

Turning to the Figures and to FIG. 1 in particular, a skid stabilizer 100 for use with a radio controlled model helicopter is shown. The skid stabilizer 100 comprises a pair of skid protectors 102a,102b. Each skid protector 102a,102b is constructed of a material with a moderate modulus of elasticity, such as, for example, aluminum, plastic, carbon fiber, and many types of wood. For example, each skid protector 102a, 102b can be constructed of birch or pine. The skid protectors 102a,102b are disposed parallel to one another. Each skid protector 102a,102b comprises a front substantially semi-hemispherical section, a middle substantially cylindrical section, and a rear substantially semispherical section. A pair of lateral supports 104a,104b joins the skid protectors 102a, 102b. The lateral supports 104a,104b are disposed so as to span the space between the skid protectors 102a,102b. The lateral supports 104a,104b can be constructed of a material with a moderate modulus of rigidity, such as, for example, aluminum, plastic, carbon fiber, and certain types of wood, such as birch or pine.

Each skid protector 102a,102b can be joined to a main skid (not shown) of a radio controlled model helicopter by a pair of twist ties. In particular, a first twist tie 106a is disposed forward of the first lateral support 104a on the first skid protector 102a; a second twist tie 106b is disposed rear of the second lateral support 104b on the first skid protector 102a; a third twist tie 106c is disposed rear of the second lateral support 104b on the second skid protector 102b; and a fourth twist tie 106d is disposed forward of the first lateral support on the second skid protector 102b. It should be noted that connection mechanisms other than twist ties can be used to join the skid protectors 102a,102b to the main skids (not shown) of a radio controlled model helicopter.

Each skid protector 102a,102b has a pad 108a,108b coupled to its bottom. In one embodiment, the pads 108a, 108b comprise a thin piece of plastic covering a flexible foam section with an adhesive backing allowing for easy replacement. The foam section can, in one embodiment, be between two and six millimeters in thickness. The pads 108a,108b can be replaced when they become damaged, or when the adhesive wears out.

Figure 2:
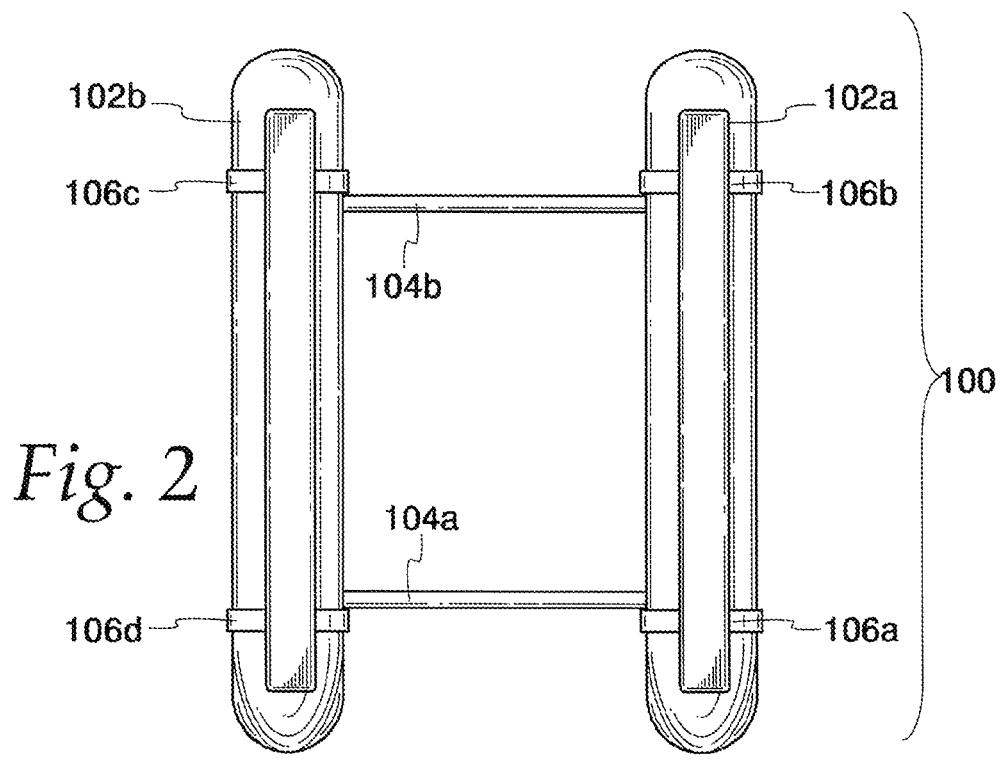
FIG. 2 is a bottom view of a skid stabilizer for use with a radio controlled model helicopter.
Figure 3:
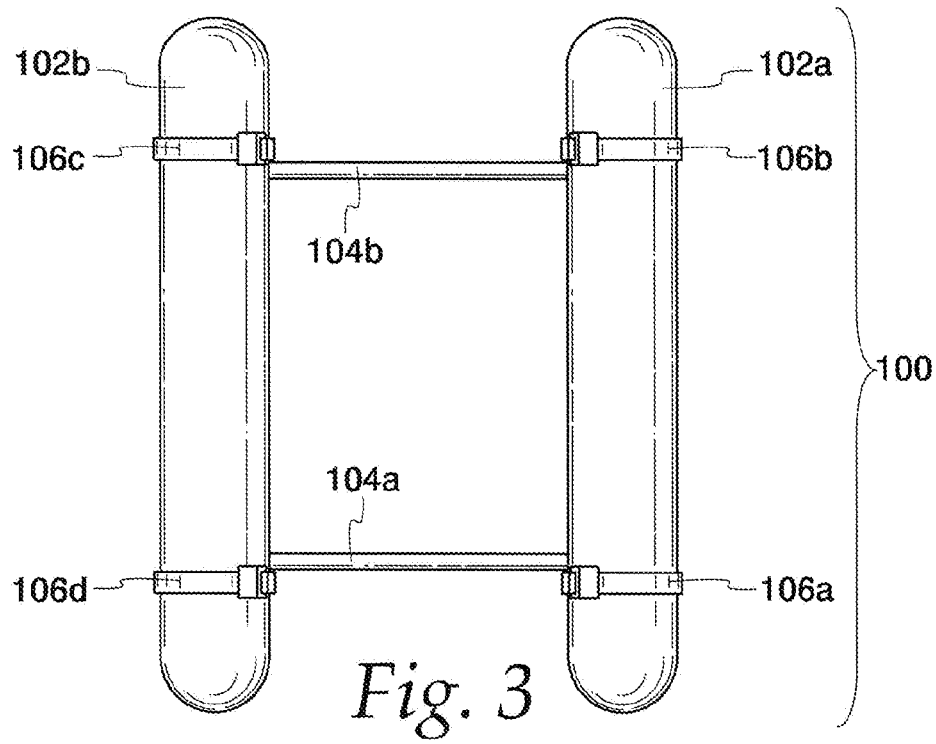
FIG. 3 is a top view of a skid stabilizer for use with a radio controlled model helicopter.

Turning to FIGS. 2 and 3, a bottom view and top view of the disclosed skid stabilizer 100 is depicted. As depicted the skid protectors 102a,102b are joined by the lateral supports 104a, 104b. The pads 108a,108b are disposed on the bottom of the skid protectors 102a,102b. in addition, the twist ties 106a, 106b,106c,106d are shown disposed on the skid protectors 102a,102b as they would be if coupled to a radio controlled model helicopter (not shown).

Figure 4:
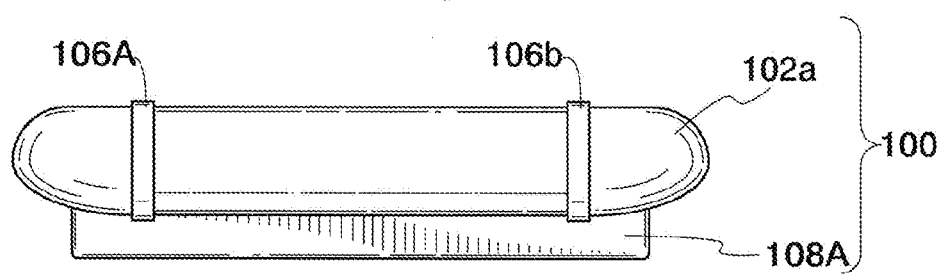
FIG. 4 is a side view of a skid stabilizer for use with a radio controlled model helicopter.
Figure 5A:
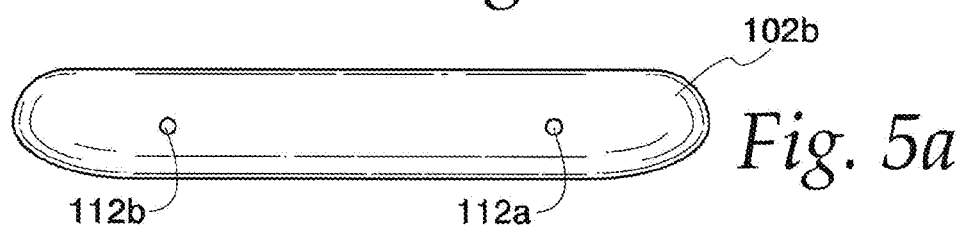
FIGS. 5a and 5b are side views of skid protectors disposed to show the interior portion of the skid protectors.
Figure 5B:
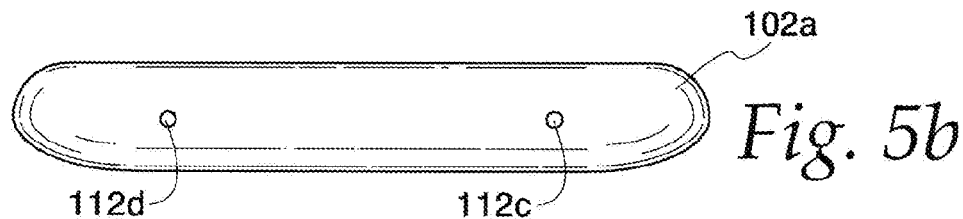

FIG. 4 depicts a side view as viewed from the outside of the disclosed skid stabilizer 100. FIGS. 5a and 5b depict inside views of the skid protectors 102a,102b. In particular, FIG. 5a shows a pair of holes 112a,112b bored into the side of the skid protector 102b, and FIG. 5b shows a pair of holes 112c,112d bored into the side of the skid protector 102a. The lateral supports 104a,104b are directly connected to the holes 112a, 112b,112c,112d and joined by an adhesive.

Figure 6:
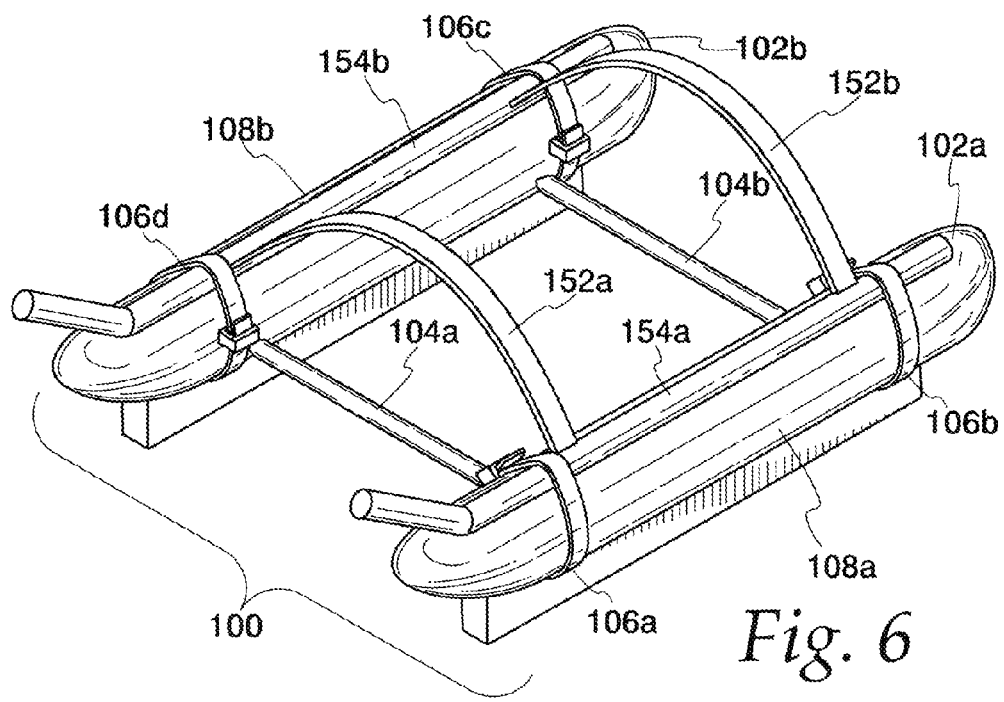
FIG. 6 is a perspective view of a skid stabilizer joined to the main skids of radio controlled model helicopter.

FIG. 6 is a perspective view of a skid stabilizer 100 joined to the main skids 154a,154b of a radio controlled model helicopter. In particular, the first skid protector 102a is joined to the right main skid 154a by pull ties 106a,106b. In addition, the second skid protector 102b is joined to the left main skid 154b by pull ties 106c,106d. Further, as depicted, struts 152a,152b join the skids 154a,154b to the superstructure of the helicopter (not shown).

The skid stabilizer 100 herein provides a number of advantages. First, it protects the main skids of a radio controlled model helicopter to which it is coupled during a hard landing. In particular, the lateral supports 104a,104b prevent the main skids of the radio controlled model helicopter from splaying outward and breaking off during a hard landing. Second, the skid stabilizer 100 stabilizes the main skids of the radio controlled model helicopter, thereby improving its flight properties during, for example, high wind conditions.

Figure 7:
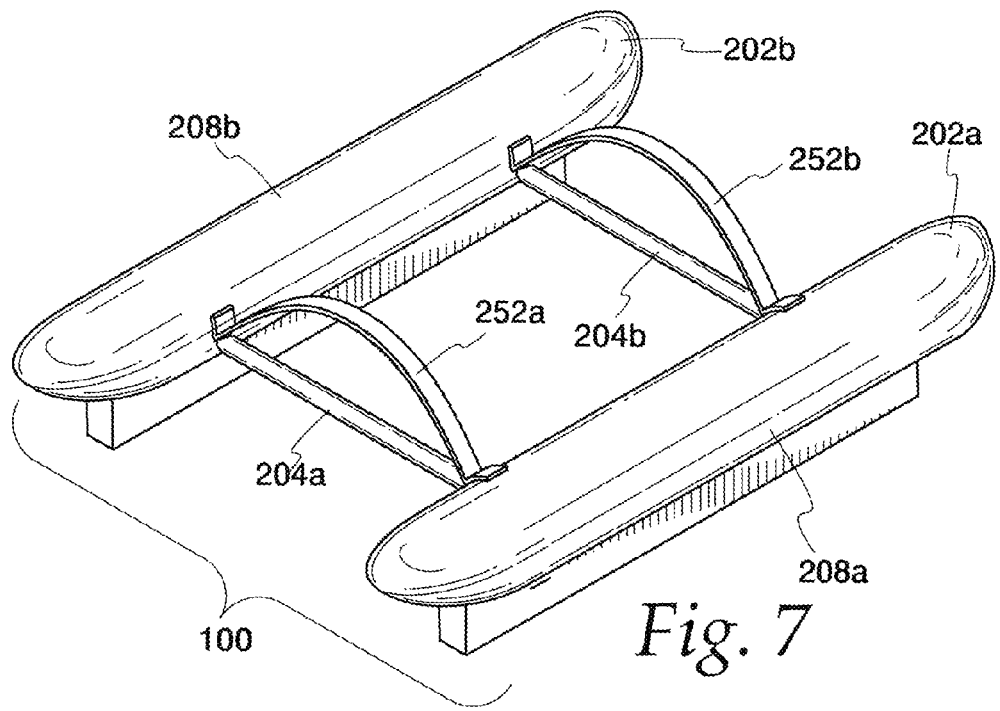
FIG. 7 is a perspective view of an improved main skid and joining structure for use with a radio controlled model helicopter.

FIG. 7 depicts an improved skid structure 200 for use with a radio controlled model helicopter (not shown). The improved skid structure 200 comprises a first main skid 202a and a second main skid 202b. The first main skid 202a is joined to the second main skid 202b by a pair of lateral supports 204a,204b. The lateral supports 204a,204b can be connected to the skid protectors 202a,202b by holes bored into the skid protectors 202a,202b as discussed with regards to the disclosed skid stabilizer. A pair of struts 252a,252b joins the main skids 202a,202b to the superstructure of the radio controlled model helicopter (not shown).

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It is intended that the scope of the disclosure not be limited by the specification, but be defined by the claims set forth below. In addition, although narrow claims may be presented below, it should be recognized that the scope of this invention is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A skid stabilizer for use with a radio controlled model helicopter comprising:
   i. a first substantially longitudinal skid protector adapted to support a first main skid of a radio controlled helicopter;
   ii. a second substantially longitudinal skid protector adapted to support a second main skid of a radio controlled helicopter;
   iii. wherein the first skid protector is disposed substantially parallel to the second skid protector;
   iv. a first lateral support coupled to the first skid protector and the second skid protector and disposed toward the front of both skid protectors so as to laterally span the space between the first skid protector and the second skid protector;
   v. a second lateral support coupled to the first skid protector and the second skid protector and disposed toward the rear of both skid protectors so as to laterally span the space between the first skid protector and the second skid protector;
   vi. a first adhesive pad coupled to the bottom of the first skid protector; and
   vii. a second adhesive pad coupled to the bottom of the second skid protector.

2. The skid stabilizer of claim 1 further comprising four pull ties, the first pull tie disposed forward of the first lateral support on the first skid protector, the second pull tie disposed rear of the second lateral support on the first skid protector, the third pull tie disposed rear of the second lateral support on the second skid protector, and the fourth pull tie disposed forward of the first lateral support on the second skid protector.

3. The skid stabilizer of claim 1 wherein the first skid protector is constructed of wood and the second skid protector is constructed of wood.

4. The skid stabilizer of claim 1 wherein the first skid protector and the second skid protector each comprise a substantially hemispherical front section, a substantially cylindrical middle section, and a substantially hemispherical rear section.

5. The skid stabilizer of claim 4 wherein the first lateral support is joined to the first hole and the second hole by adhesive and wherein the second lateral support is joined to the third hole and the fourth hole by adhesive.

6. A landing gear coupled to the superstructure of a radio controlled helicopter comprising:
   i. a first substantially longitudinal main skid protector;
   ii. a second substantially longitudinal main skid protector;
   iii. wherein the first and second main protectors each comprise a front substantially hemispherical section, a middle substantially cylindrical section, and a rear substantially hemispherical section;
   iv. wherein the first main skid protector is disposed parallel to the second main skid protector;
   v. a first lateral support coupled to the first main skid protector and the second main skid protector and disposed toward the front of both main skids protectors so as to laterally span the space between the first main skid protector and the second main skid protector;
   vi. a second lateral support coupled to the first main skid protector and the second main skid protector and disposed toward the rear of both main protectors so as to laterally span the space between the first main skid protector and the second main skid protector;
   vii. a first adhesive pad coupled to the bottom of the first main skid protector; and viii. a second adhesive pad coupled to the bottom of the second main skid protector.

* * * * *